May 9, 1933.  A. M. CURTIS  1,907,745

INDICATING DEVICE

Filed March 16, 1931

INVENTOR
A.M. CURTIS
BY
ATTORNEY

Patented May 9, 1933

1,907,745

UNITED STATES PATENT OFFICE

AUSTEN M. CURTIS, OF EAST ORANGE, NEW JERSEY, ASSIGNOR TO BELL TELEPHONE LABORATORIES, INCORPORATED, OF NEW YORK, N. Y., A CORPORATION OF NEW YORK

INDICATING DEVICE

Application filed March 16, 1931. Serial No. 523,169.

This invention relates to indicating devices and more particularly to damping the vibrating elements of such devices.

Among the indicating devices to which this invention is particularly applicable are those comprising an element adapted to vibrate in accordance with variations in electric current flowing therethrough. While the motion of such a vibrating element is, to a certain extent, damped by air friction, yet it is necessary to have some additional damping in order to have it operate properly as a vibrator. It has heretofore been suggested that this additional damping be obtained by means of a circuit in parallel with the vibrating element and comprising a capacity, an inductance and a resistance, all in series, the values of the capacity and inductance being such that the resonant period of the capacity and inductance when closed on themselves is equal to the resonant period of the indicating instrument. This method of damping the vibrating element is satisfactory as far as the fundamental mode of vibration is concerned but the element may vibrate in modes other than the fundamental and when it does the single shunt is unsatisfactory. For example, if the vibrating element is adjusted to a natural frequency of vibration of 3000 or more cycles and a wave of current having a nearly vertical front is applied to the vibrating element the third harmonic vibration of the element is plainly noticeable.

An object, therefore, of the present invention is to provide means for damping the vibrating element of an indicating device regardless of its mode of vibration.

In accordance with the present invention, this object is attained by shunting the vibrating element by means of one or more shunts which are respectively resonant to different harmonics of the vibrating element.

In accordance with another feature of this invention means are provided for protecting the vibrating element from excessive currents which for example may be caused by the discharge of the condensers in the resonant shunts when the vibrating element is disconnected and then reconnected to the indicating instrument. This means comprises a resistance element connected in shunt with the resonant shunt circuits, the resistance being large enough so that it does not affect the normal operation of the resonant shunts but small enough so that it will quickly discharge the condensers in case the vibrating element is disconnected from the instrument.

For a clearer understanding of this invention reference may be had to the accompanying drawing in which.

Figure 1:
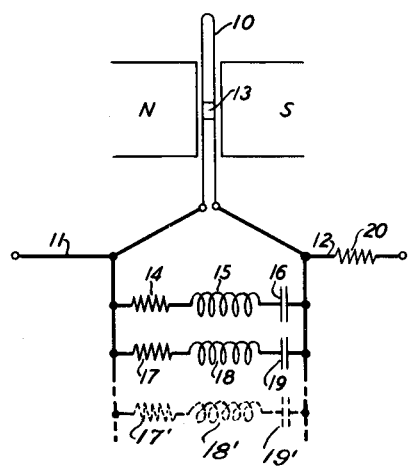
Fig. 1 represents diagrammatically one form of this invention.
Figure 2:
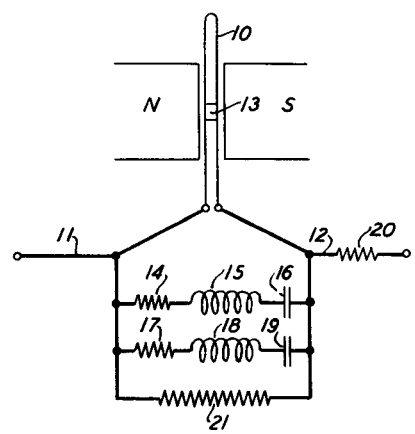
Fig. 2 represents diagrammatically a modified form of the invention.

Referring to the drawing 10 represents the vibrating element of an indicating device such as a galvanometer and may, for example, be made from a fine conducting wire or string. This wire or string is made part of a circuit, the current variations of which are to be studied by connecting it to leads 11 and 12 and is mounted in the magnetic field which exists between pole pieces N and S of a magnet. When there is any variation in the current flowing through string 10 it will vibrate and the mirror 13 attached thereto will vibrate accordingly. By having this mirror reflect a beam of light onto a moving light sensitive film, an oscillogram of the current variations in the circuit may be obtained.

String 10 in vibrating is to a certain extent damped by air friction, yet in many instances it is necessary to supply some additional damping means in order to have it operate properly as a galvanometer vibrator. This additional damping is brought about by means of a circuit in parallel with the strong, this circuit comprising a resistance 14, an inductance 15 and a capacity 16, the resistance 14 being used to insure that the proper amount of current flows through the string 10 and capacity 16 and inductance 15 being used to tune this parallel circuit so that it is resonant to the resonant period of the galvanometer. This method of providing the necessary additional damping means is satisfactory as far as the fundamental mode of vibration is concerned, but is not satisfactory when the string vibrates in modes other than the fundamental, for example, when the vibrating string breaks up into three segments because only one of the three segments is effective in damping the vibrations of the string and the shunt is effectively an open circuit for the third harmonic frequency. In accordance with the present invention the vibration of the string is effectively damped when it breaks up into three segments, by combining with the resonant shunt described, a second resonant shunt comprising a resistance 17, an inductance 18 and a capacity 19, the values of the inductance 18 and capacity 19 when closed on themselves being such that the resonance period of the shunt circuit is equal to the third harmonic of the string's vibration. In this combination one shunt is resonant to the fundamental and another shunt is resonant to the third harmonic of the string's vibration, hence, when the string breaks up into three segments during its vibration, it is effectively damped. Similarly, in the event that the string breaks up into additional segments during its vibration, it may be effectively damped by simply adding additional resonant shunts such for example as the shunt circuit shown in dotted lines and including the resistance 17', inductance 18' and capacity 19'.

An additional feature resides in the fact that means are provided for protecting the string from excessive currents when disconnecting and reconnecting the shunts. This is desirable since it frequently happens that the operator disconnects the string 10 from the resonant shunt while leaving the latter connected to leads 11 and 12 through resistance 20 which is high enough so that under normal conditions the proper operating current passes through string 10. Subsequent to the disconnection of the string, the shunts would be disconnected but the condensers 16 and 19 would be left charged. As the condensers employed are usually paper condensers they are capable of remaining charged for several days. Hence, when the string is reconnected to the shunt, the instantaneous current resulting from the discharge of the condensers may be sufficient to burn out the string. This is prevented in the present invention by adding as a third element to the double resonant shunt, a shunt resistance 21 large enough so that it does not effect the normal operation of the resonant shunt but still small enough so that it will quickly discharge the condensers in case the galvanometer string is disconnected from the shunt.

What is claimed is:

1. An indicating device comprising an element adapted to vibrate in accordance with variations in electric current flowing therethrough and means for damping the vibration of said element at one of its harmonic frequencies.

2. An indicating device comprising an element adapted to vibrate in accordance with variations in electric current flowing therethrough and means for damping the vibration of said element, said damping means comprising a plurality of resonant circuits in parallel with said element.

3. An indicating device comprising an element adapted to vibrate in response to variations in electric current flowing therethrough, means for damping the vibration of said element, said means comprising a circuit in parallel with said element and resonant for at least one harmonic of the element's vibration.

4. An indicating device comprising an element adapted to vibrate in accordance with variations in electric current flowing therethrough, means for damping the vibration of said element, and a shunt circuit for protecting said element from excessive currents, the resistance of said shunt being large enough so that it does not affect the normal operation of said damping means.

5. An indicating device comprising an element adapted to vibrate in accordance with variations in electric current flowing therethrough, means for damping the vibration of said element, said means comprising a plurality of circuits in parallel with said element and respectively resonant to different harmonics of the vibrating element.

6. A galvanometer comprising a string adapted to vibrate in accordance with variations in electric current flowing therethrough, means for damping the vibration of the string comprising a plurality of circuits in parallel with the string, said circuits comprising resistances, inductances and capacities and of such values that the circuits are tuned to different harmonics of the string's vibration.

7. An indicating device comprising an element adapted to vibrate in response to variations in electric currents flowing therethrough, means for damping the vibration of said element, said means comprising a circuit resonant to the fundamental, and a second circuit in parallel therewith resonant to the third harmonic of said element.

8. An indicating device comprising an element adapted to vibrate in response to variations in electric current flowing therethrough, a plurality of resonant circuits in parallel with said element for damping the vibration thereof, and a resistance unit in parallel with said circuits for protecting said element against excessive currents flowing therethrough, the resistance of said unit being large enough so that it does not affect the normal operation of said resonant circuits.

In witness whereof, I hereunto subscribe my name this 12th day of March, 1931.

AUSTEN M. CURTIS.